(12) United States Patent
Mei et al.

(10) Patent No.: US 8,094,892 B2
(45) Date of Patent: Jan. 10, 2012

(54) AUTOMATIC PHOTO ORIENTATION DETECTION

(75) Inventors: Li Mei, Hangzhou (CN); Jin Wang, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 1074 days.

(21) Appl. No.: 11/942,651

(22) Filed: Nov. 19, 2007

(65) Prior Publication Data

US 2009/0129636 A1 May 21, 2009

(51) Int. Cl.
*G06K 9/00* (2006.01)
*G06K 9/32* (2006.01)

(52) U.S. Cl. ........................................ 382/118; 382/297

(58) Field of Classification Search .......... 382/293–297, 382/165, 170, 224–227, 118
See application file for complete search history.

(56) References Cited

U.S. PATENT DOCUMENTS

| | | |
|---|---|---|
| 2005/0231745 A1 | 10/2005 | Kawai et al. |
| 2006/0204110 A1 | 9/2006 | Steinberg et al. |
| 2006/0257039 A1 | 11/2006 | Matsuhira |
| 2008/0152199 A1* | 6/2008 | Oijer ............................ 382/118 |

OTHER PUBLICATIONS

Jiebo Luo, "Automatic Image Orientation Detection via Confidence-Based Integration of Low-Level and Semantic Cues," IEEE Transactions on Pattern Analysis and Machine Intelligence, vol. 27, No. 5, May 2005, pp. 715-726.
European Search Report, 7 pages, Sep. 6, 2011.
Yongmei M. Wang et al., "Detecting image orientation based on low-level visual content," Computer Vision and Image Understanding 93 (2004) pp. 328-346.

* cited by examiner

*Primary Examiner* — Brian Le
(74) *Attorney, Agent, or Firm* — Patent Law Group LLP; David C. Hsia

(57) ABSTRACT

A method determining image orientation includes determining if an image includes an orientation tag and if the tag indicates the image is rotated +90 or −90 degrees. When the image does not include the tag or the tag does not indicate the image is rotated, the method includes determining if a face is detected in the original image and displaying the original image when a face is detected. When a face is not detected, the method includes rotating the image +90 and −90 degrees and detecting a face in the rotated images. When a face is not detected, the method includes applying a classifier to determine the image's proper orientation. When a face is detected in one rotated image, the method includes displaying the rotated image. When a face is detected in both rotated images, the method includes applying the classifier to determine the image's proper orientation.

6 Claims, 2 Drawing Sheets

AUTOMATIC PHOTO ORIENTATION DETECTION

CROSS REFERENCE TO RELATED APPLICATION

This application is related to U.S. application Ser. No. 11/323,653, entitled "Face Detection on Mobile Devices," and U.S. application Ser. No. 11/323,654, entitled "Facial Feature Detection on Mobile Devices," which are commonly assigned and incorporated by reference in their entirety.

FIELD OF INVENTION

This invention relates to methods for detecting image orientation.

DESCRIPTION OF RELATED ART

Many newer digital cameras have built-in orientation sensors and the output of the sensor is used to set the exchangeable image file format (EXIF) orientation flag in the image file's metadata to reflect the position of the camera with respect to the ground. The EXIF orientation flag has a value that ranges from 1 to 8 that indicates 8 orientations for the image. As FIG. 1 shows, a value of 1, which is the default value, indicates that the $0^{th}$ row is at the visual top of the image, and the $0^{th}$ column is the visual left-hand side. A value of 6 indicates the $0^{th}$ row is the visual right-hand side of the image and the $0^{th}$ column is the visual top. A value of 8 indicates the $0^{th}$ row is the visual left-hand side of the image, and the $0^{th}$ column is the visual bottom.

Displaying images in their correct orientation is one of the basic requirements for a photo management software. Even if the image does not have an EXIF orientation flag, it would be desired that the software can detect the correct orientation of the image so the user does not have to manually rotate the image.

SUMMARY

In one embodiment of the invention, a method for determining a proper orientation of a digital image includes determining if the image includes an orientation tag and if the orientation tag indicates the image is rotated +90 or −90 degrees. When the image does not include the orientation tag or the orientation tag does not indicate the image is rotated +90 or −90 degrees, the method includes determining if a face is detected in the image in its original orientation and displaying the image in its original orientation when a face is detected. When a face is not detected in the image in its original orientation, the method includes rotating the image +90 and −90 degrees to generate two rotated images and detecting a face in the two rotated images. When a face is not detected in the two rotated images, the method includes applying a classifier to the image to determine its proper orientation. When a face is detected in one rotated image, the method includes displaying the rotated image. When a face is detected in both rotated images, the method includes applying the classifier to the image to determine its proper orientation.

BRIEF DESCRIPTION OF THE DRAWINGS

Use of the same reference numbers in different figures indicates similar or identical elements.

DETAILED DESCRIPTION OF THE INVENTION

In accordance with the invention, a method is provided to automatically detect the orientation of a digital image (e.g., a digital photograph). The possible orientations of the image are limited to rotation angles of 0, +90, and −90 degrees. The rotation angle of 180 degrees is not considered because it is a highly unlikely orientation for a digital image. The method combines the use of the EXIF orientation tag, face detection, and orientation detection based on a classifier trained by supervised learning.

Figure 1:
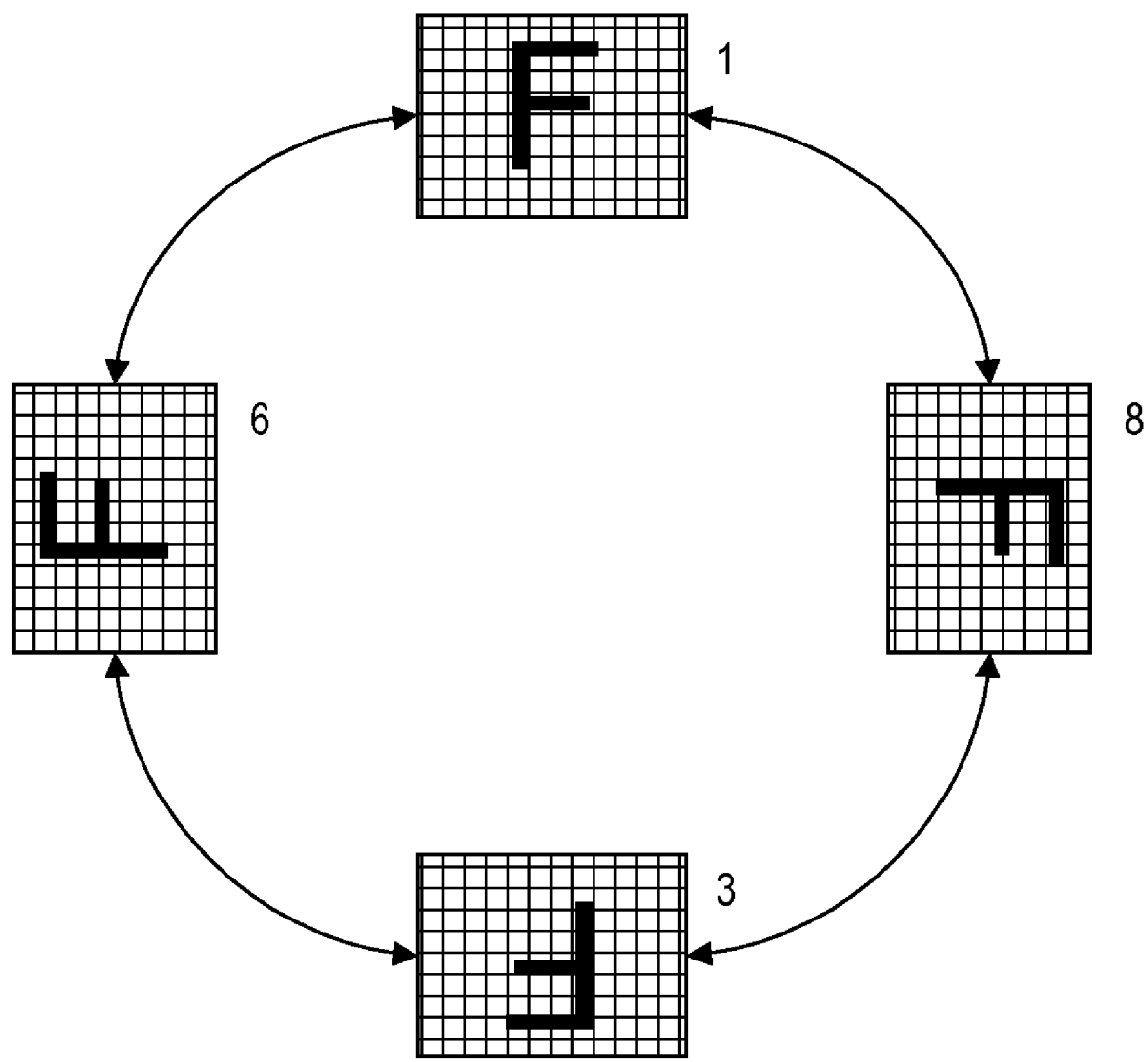
FIG. 1 illustrates rotated images and their corresponding EXIF rotational tags.
Figure 2:
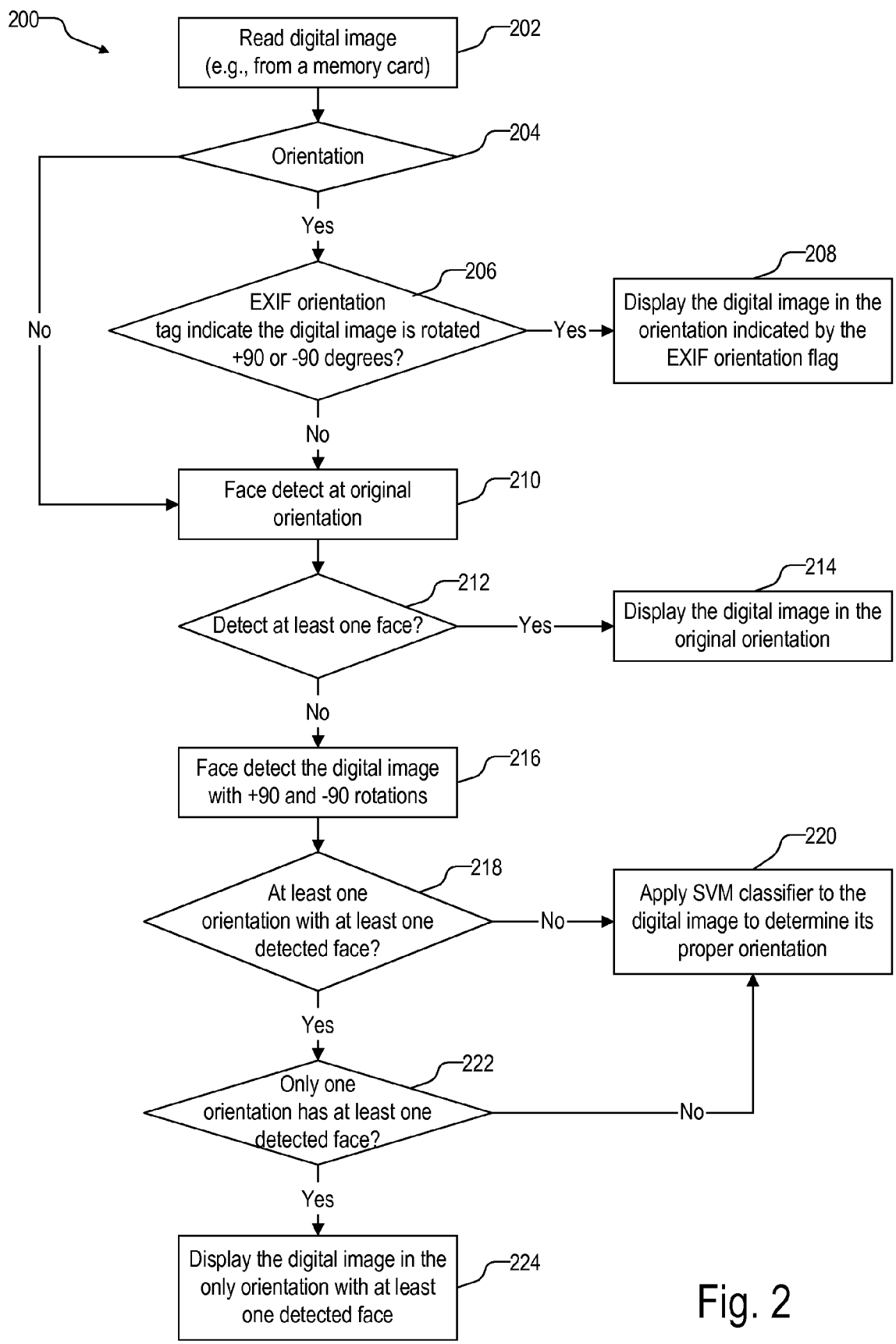
FIG. 2 is a flowchart of a method to detect the proper orientation of a digital image in one embodiment of the invention.

FIG. 2 is a flowchart of a method 200 to detect the orientation of a digital image in one embodiment of the invention. Method 200 can be implemented as software loaded from memory and executed by a processor in a computer. The software may be an image management program.

In step 202, the processor reads a digital image from a memory. The memory may be a hard disk, a memory card, or similar storage devices.

In step 204, the processor determines if the image is embedded with an orientation tag (e.g., an EXIF orientation tag). If so, step 204 is followed by step 206. Otherwise step 204 is followed by step 210.

In step 206, the processor determines if the EXIF orientation tag indicates that the image is to be rotated +90 degrees or −90 degrees (i.e., the EXIF orientation tag has a value of 6 or 8). If so, then step 206 is followed by step 208. Otherwise step 206 is followed by step 210. Note that when the EXIF orientation tag does not indicate +90 degree or −90 degree rotations, it is assumed that the EXIF orientation tag is not accurate since cameras commonly save a default value of 1 for the EXIF orientation tag when their orientation sensing feature is turned off.

In step 208, the processor displays the image on a screen in the orientation indicated by the EXIF orientation tag. Specifically, the processor rotates the image according to the EXIF orientation tag and then displays the image.

In step 210, the processor applies a face detection algorithm to the image at its original orientation (i.e., without any rotation) to detect one or more faces in the image. The detection of a face helps to determine the proper orientation of an image because faces are normally captured in an upright orientation. In one embodiment, the processor uses the face detection algorithm described in U.S. application Ser. No. 11/323,653, entitled "Face Detection on Mobile Devices," and U.S. application Ser. No. 11/323,654, entitled "Facial Feature Detection on Mobile Devices," which are commonly assigned and incorporated by reference in its entirety. Alternatively, the processor may use a conventional face detection algorithm. Step 210 is followed by step 212.

In step 212, the processor determines if the face detection algorithm returns at least one face. If so, step 212 is followed by step 214. Otherwise step 212 is followed by step 216.

In step 214, the processor displays the image in its original orientation without any rotation to the user.

In step 216, the processor rotates the image +90 degrees and −90 degrees to form two rotated images. The processor then applies the face detection algorithm to the two rotated images to detect one or more faces in the rotated images. Step 216 is followed by step 218.

In step 218, the processor determines if the face detection algorithm returns at least one face in one of the two rotated images. If not, then step 218 is followed by step 220. Otherwise step 218 is followed by step 222.

In step 220, the processor applies a multi-class classifier to the image at its original orientation (i.e., without any rotation) to determine the proper orientation of the image. The classifier outputs the probability of the image to be in one of three classes: 0, +90, and −90 degrees of rotation. The processor selects the class with the highest probability as the proper orientation for the image. The processor then rotates the image according to its class and then displays the rotated image. In one embodiment, the classifier includes support vector machines (SVMs) based on luminance and chrominance low-level content as described in "Detecting image orientation based on low-level visual content" by Y. M. Wang et al., Computer Vision and Image Understanding, Volume 93, Issue 3, March 2004, pages 328-346, which is incorporated by reference in its entirety.

In step 222, the processor determines if the face detection algorithm returns at least one face in only one of the two rotated images. If so, then step 222 is followed by step 224. Otherwise step 222 is followed by step 220 where the processor applies the multi-class classifier to the image at its original orientation (i.e., without any rotation) to determine the proper orientation of the image.

In step 224, the processor displays the rotated image that has at least one face to the user.

Various other adaptations and combinations of features of the embodiments disclosed are within the scope of the invention. Numerous embodiments are encompassed by the following claims.

The invention claimed is:

1. A method for detecting an orientation of a digital image, comprising:
   determining, using a processor, if the digital image includes an orientation tag;
   when the digital image does not include an orientation tag:
      detecting, using the processor, a face in the digital image in its original orientation; and
      when a face is detected in the digital image in its original orientation, displaying the digital image in its original orientation without rotation;
   when the digital image includes an orientation tag:
      determining, using the processor, if the orientation tag indicates the image is rotated to one of (1) +90 degrees and (2) −90 degrees; and
      when the orientation tag does not indicate the image is rotated to one of (1) +90 degrees and (2) −90 degrees:
         detecting, using the processor, a face in the digital image in its original orientation; and
         when a face is detected in the digital image in its original orientation, displaying the digital image in its original orientation without rotation;
   when a face is not detected in the digital image in its original orientation:
      rotating the digital image +90 degrees to form a first rotated image and detecting, using the processor, a face in the first rotated image;
      rotating the digital image −90 degrees to form a second rotated image and detecting, using the processor, a face in the second rotated image;
      determining, using the processor, if a face is detected in at least one of the first and the second rotated images;
   when a face is not detected in at least one of the first and the second rotated images:
      applying a classifier, using the processor, to the digital image in its original orientation to determine probabilities of the digital image being in one of three orientations; and
      displaying the digital image in one of the three orientations having the highest probability;
   when a face is detected in at least one of the first and the second rotated images:
      determining, using the processor, if a face is detected in only one of the first and the second rotated images; and
      when a face is detected in only one of the first and the second rotated images, displaying said only one of the first and the second rotated images.

2. The method of claim 1, further comprising:
   when a face is detected in both of the first and the second rotated images:
      applying the classifier to the digital image in its original orientation to determine probabilities of the digital image being in one of three orientations; and
      displaying the digital image in one of the three orientations having the highest probability.

3. The method of claim 1, wherein:
   the digital image is rotated −90 degrees when the orientation tag indicates a $0^{th}$ row is a visual right-hand side of the digital image and a $0^{th}$ column is a visual top of the digital image; and
   the digital image is rotated +90 degrees when the orientation tag indicates the $0^{th}$ row is a visual left-hand side of the digital image and the $0^{th}$ column is a visual bottom of the digital image.

4. A non-transitory computer-readable storage medium encoded with executable instructions for execution by a processor to detect an orientation of a digital image, the instructions comprising:
   determining if the digital image includes an orientation tag;
   when the digital image does not include an orientation tag:
      detecting a face in the digital image in its original orientation; and
      when a face is detected in the digital image in its original orientation, displaying the digital image in its original orientation without rotation;
   when the digital image includes an orientation tag:
      determining if the orientation tag indicates the image is rotated to one of (1) +90 degrees and (2) −90 degrees; and
      when the orientation tag does not indicate the image is rotated to one of (1) +90 degrees and (2) −90 degrees:
         detecting a face in the digital image in its original orientation; and
         when a face is detected in the digital image in its original orientation, displaying the digital image in its original orientation without rotation;
   when a face is not detected in the digital image in its original orientation:
      rotating the digital image +90 degrees to form a first rotated image and detecting a face in the first rotated image;
      rotating the digital image −90 degrees to form a second rotated image and detecting a face in the second rotated image;
      determining if a face is detected in at least one of the first and the second rotated images;
   when a face is not detected in at least one of the first and the second rotated images:

applying a classifier to the digital image in its original orientation to determine probabilities of the digital image being in one of three orientations; and displaying the digital image in one of the three orientations having the highest probability;

when a face is detected in at least one of the first and the second rotated images:

determining if a face is detected in only one of the first and the second rotated images; and when a face is detected in only one of the first and the second rotated images, displaying said only one of the first and the second rotated images.

5. The non-transitory computer-readable storage medium of claim 4, wherein the instructions further comprise:

when a face is detected in both of the first and the second rotated images:

applying the classifier to the digital image in its original orientation to determine probabilities of the digital image being in one of three orientations; and displaying the digital image in one of the three orientations having the highest probability.

6. The non-transitory computer-readable storage medium of claim 4, wherein the instructions further comprise:

the digital image is rotated −90 degrees when the orientation tag indicates a $0^{th}$ row is a visual right-hand side of the digital image and a $0^{th}$ column is a visual top of the digital image; and the digital image is rotated +90 degrees when the orientation tag indicates the $0^{th}$ row is a visual left-hand side of the digital image and the $0^{th}$ column is a visual bottom of the digital image.

* * * * *